United States Patent [19]

Higuchi et al.

[11] Patent Number: 5,223,583
[45] Date of Patent: Jun. 29, 1993

[54] PROCESS FOR PRODUCING POLYALKYLENE OXIDE DERIVATIVES

[75] Inventors: Toshihiko Higuchi; Shigeyuki Kozawa, both of Yokohama, Japan

[73] Assignee: Asahi Glass Company Ltd., Tokyo, Japan

[21] Appl. No.: 518,428

[22] Filed: May 3, 1990

[30] Foreign Application Priority Data

May 9, 1989 [JP] Japan .................... 1-114058

[51] Int. Cl.$^5$ ........................... C08F 283/06
[52] U.S. Cl. ........................... 525/404; 526/120
[58] Field of Search ............... 525/404; 526/120; 568/606

[56] References Cited

U.S. PATENT DOCUMENTS

| | | | |
|---|---|---|---|
| 3,278,458 | 10/1966 | Belner | 528/412 |
| 3,829,505 | 8/1974 | Herold | 260/611 B |
| 4,323,488 | 4/1982 | Takago et al. | 528/32 |
| 4,472,560 | 9/1984 | Kuyper et al. | 526/120 |
| 4,593,068 | 6/1986 | Hirose et al. | 525/100 |

FOREIGN PATENT DOCUMENTS 0196569 10/1986 European Pat. Off. .
1058385 2/1967 United Kingdom .

Primary Examiner—Melvyn I. Marquis
Assistant Examiner—Aylward D.
Attorney, Agent, or Firm—Oblon, Spivak, McClelland, Maier & Neustadt

[57] ABSTRACT

A process for producing an unsaturated group-terminated polyalkylene oxide, which comprises subjecting a monoepoxide having at least 3 carbon atoms to ringopening addition polymerization to an initiator in the presence of a double metal cyanide complex catalyst, followed by converting terminal hydroxyl groups of the resulting hydroxyl group terminated polyalkylene oxide to unsaturated groups.

19 Claims, No Drawings

PROCESS FOR PRODUCING POLYALKYLENE OXIDE DERIVATIVES

The present invention relates to a process for producing an unsaturated group terminated polyalkylene oxide and a process for producing a hydrolyzable silyl group-terminated polyalkylene oxide.

A polyalkylene oxide having unsaturated groups at the terminals undergoes a curing reaction and thus can be used as an elastic material. Further, it is possible to obtain a very flexible curable composition by introducing other functional groups such as hydrolyzable silyl groups by utilizing the reactivity of the terminal unsaturated groups.

In either case, in order to let the cured product have flexibility, it is necessary to employ a polyalkylene oxide having a high molecular weight. However, in a conventional method in which the polymerization of a polyalkylene oxide is conducted by means of an alkali catalyst such as KOH, and the terminal alkoxide groups are reacted with an unsaturated group-containing active halogen compound such as allyl chloride to obtain an unsaturated group-terminated polyalkylene oxide, if the molecular weight of the polyalkylene oxide exceeds 3,000, the amount of the by-product unsaturated monool increases, and a substantial decrease in the number of functional groups and widening of the molecular weight distribution will be brought about, whereby it is hardly possible to obtain the desired curable composition.

Japanese Unexamined Patent Publication No. 149797/1975 proposes a method intended to overcome these problems. However, such a method is still inadequate in that it requires a complicated reaction step including a molecular chain extending reaction of polyoxyalkylenes themselves and the molecular weight distribution tends to be widened. Further, this method is limited to the production of a linear polyalkylene oxide and can not produce a polyalkylene oxide having three or more terminal groups.

Japanese Unexamined Patent Publication No. 215623/1986 proposes a method in which the polymerization of a polyalkylene oxide having a high molecular weight and a narrow molecular weight distribution is conducted by living polymerization by means of a complex catalyst which is obtainable by reacting an organic aluminum compound and porphyrin, to obtain an unsaturated terminal group-containing polyalkylene oxide. However, this method has a problem that the polyalkylene oxide tends to be colored by the influence of the metal porphyrin complex used as the catalyst, and it is not practically useful.

The present inventors have conducted extensive researches with an aim to solve the above mentioned problems. As a result, they have found it possible to obtain a practically useful unsaturated terminal group-containing polyalkylene oxide having a high molecular weight, narrow molecular weight distribution and no substantial coloring, by introducing unsaturated terminal groups to a polyalkylene oxide polymerized by means of a double metal cyanide complex catalyst.

Thus, the present invention provides a process for producing an unsaturated group-terminated polyalkylene oxide, which comprises subjecting a monoepoxide having at least 3 carbon atoms to ring-opening addition polymerization to an initiator in the presence of a double metal cyanide complex catalyst, followed by converting terminal hydroxyl groups of the resulting hydroxyl group-terminated polyalkylene oxide to unsaturated groups.

The present invention also provides a process for producing a hydrolyzable silyl group-terminated polyalkylene oxide, which comprises subjecting a monoepoxide having at least 3 carbon atoms to ringopening addition polymerization to an initiator in the presence of a double metal cyanide complex catalyst, followed by converting terminal hydroxyl groups of the resulting hydroxyl group-terminated polyalkylene oxide to unsaturated groups, and reacting a hydrosilicon compound having a hydrolyzable group to the unsaturated groups.

Now, the present invention will be described in detail with reference to the preferred embodiments.

As the monoepoxide having at least 3 carbon atoms to be used in the present invention, an aliphatic alkylene oxide having at least 3 carbon atoms such as propylene oxide, 1,2-butylene oxide, 2,3-butylene oxide or epichlorohydrin, or an aromatic alkylene oxide such as styrene oxide, may be mentioned. An aliphatic alkylene oxide is preferred. Particularly preferred is propylene oxide. A relatively small amount of ethylene oxide may be copolymerized with propylene oxide.

As the initiator to be used in the present invention, a polyvalent active hydrogen-containing compound such as a polyhydric alcohol, a polyhydric phenol or a polybasic carboxylic acid, a monoepoxide adduct thereof having a molecular weight lower than the desired product, an unsaturated group-containing active hydrogen-containing compound such as an unsaturated alcohol, an unsaturated phenol or an unsaturated carboxylic acid, or a monoepoxide adduct thereof having a molecular weight lower than the desired product, may be employed. As the polyvalent active hydrogen-containing compound, a 2–8 valent polyhydric alcohol is preferred. Particularly preferred is a 3–4 valent polyhydric alcohol, or a mixture of a dihydric alcohol with a 3–8 valent polyhydric alcohol. As the unsaturated group-containing active hydrogen-containing compound, allyl alcohol is particularly preferred.

As disclosed in the following references, the double metal cyanide complex catalyst in the present invention, is believed to have the following formula (1):

References: U.S. Pat. Nos. 3,278,457, 3,278,458, 3,278,459, 3,427,256, 3,427,334, 3,427,335, 3,829,505, 3,941,849, 4,355,188, 4,472,560 and 4,721,818 and Japanese Unexamined Patent Publication No. 277236/1988

$$M_a[M'_x(CN)_y]_b(H_2O)_c(R)_d \tag{1}$$

wherein M is e.g. Zn(II), Fe(II), Fe(III), Co(II), Ni(II), Al(III), Sr(II), Nm(II), Cr(III), Cu(II), Sn(II), Pb(II), Mo(IV), Mo(VI), W(IV) or W(VI), M' is e.g. Fe(II), Fe(III), Co(II), Co(III), Cr(II), Cr(III), Mn(II), Mn(III), Ni(II), V(IV) or V(V), R is an organic ligand, a, b, x and y are positive integers variable depending upon the valences and coordination numbers of the metals, and c and d are positive numbers variable depending upon the coordination numbers of the metals.

In the formula (1), M is preferably Zn(II), and M' is preferably Fe(II), Fe(III), Co(II) or Co(III). The organic ligand may be, for example, a ketone, an ether, an aldehyde, an ester, an alcohol or an amide.

The double metal cyanide complex of the formula (1) can be prepared by mixing a metal salt $MX_a$ wherein M and a are as defined above, and X is an anion capable of forming a salt with M, and a polycyano metalate (salt) $Z_e[M'_x(CN)_y]_f$ wherein M', x and y are as defined above, Z is e.g. hydrogen, an alkali metal or an alkaline earth metal, and e and f are positive integers determined by the valences and the coordination numbers of Z and M', in their aqueous solutions or in their solutions in a solvent mixture of water and an organic solvent, contacting an organic ligand R to the resulting double metal cyanide, followed by removal of excess solvent and organic compound R.

In the polycyano metalate (salt) $Z_e[M'_x(CN)_y]_f$, hydrogen or various metals including alkali metals, may be used as Z, but a lithium salt, a sodium salt, a potassium salt, a magnesium salt or a calcium salt, is preferred. Particularly preferred is a usual alkali metal salt such as a sodium salt or a potassium salt.

When a polyalkylene oxide is produced by means of the above mentioned double metal cyanide complex catalyst according to the present invention, it is possible to produce a hydroxyl group-terminated polyalkylene oxide having a very high molecular weight and a small content of an unsaturated monool. This hydroxyl group-terminated polyalkylene oxide has also a feature that the molecular weight distribution is very narrow.

In the present invention, firstly the ring-opening polymerization of the monoepoxide to the above mentioned initiator is conducted by means of the above mentioned double metal cyanide complex catalyst to produce a polyalkylene oxide containing hydroxyl groups at the terminals. The resulting polyalkylene oxide is a polyalkylene oxide of a high molecular weight having at its terminals a number of hydroxyl groups corresponding to the number of functional groups of the initiator employed. Specifically, polyoxypropylenediol, polyoxypropylenetriol, polyoxypropylenetetraol or polyoxypropylenediol monoallyl ether may, for example, be mentioned. These polyalkylene oxides may be a mixture of two or more different types. The molecular weight per terminal group of this polyalkylene oxide is preferably at least 2,000, particularly at least 4,000. The number of terminal groups is preferably from 2 to 8, particularly from 2 to 6. The molecular weight (the molecular weight per terminal group x the number of terminal groups) is preferably from 15,000 to 80,000, particularly from 20,000 to 50,000. More preferably, the number of terminal groups exceeds 2 from the viewpoint of the curing properties of the after-mentioned derivative derived from this polyalkylene oxide. Namely, the higher the molecular weight of a polyalkylene oxide having two terminal groups, the larger the molecular weight between the cross linking points of the cured product, whereby the mechanical properties such as strength tend to be inadequate although the elongation will be large. Accordingly, it is preferred to introduce cross linking points by using a polyalkylene oxide having more than two terminal groups. Thus, particularly preferred as the polyalkylene oxide is a polyalkylene oxide having from 2.3 to 4 terminal groups.

After the preparation of the hydroxyl group-terminated polyalkylene oxide as mentioned above, unsaturated groups are introduced to the hydroxyl group-terminals to produce an unsaturated group-terminated polyalkylene oxide.

The following methods may be mentioned as specific methods for introducing unsaturated groups to the hydroxyl group-terminals. However, the method for the introduction of unsaturated groups is not restricted to such specific methods.

(a) The terminal hydroxyl groups are reacted with an alkali metal or an alkali metal compound to convert them to alkoxide groups, and then reacting the alkoxide groups with an active hydrogen compound having unsaturated terminal groups.

(b) In a case where the hydroxyl group-terminated polyalkylene oxide has one unsaturated group and one hydroxyl group as the terminal groups, the hydroxyl group is converted to an alkoxide group, followed by dimerization or oligomerization by means of a polyvalent halogen compound to obtain an unsaturated terminal group-containing polyalkylene oxide.

As the unsaturated group, an alkenyl group is preferred, but it is not necessarily limited to the alkenyl group. As the alkenyl group, an alkenyl group having at most 6 carbon atoms, such as an allyl group, an isopropenyl group or a 1-butenyl group, is preferred. An allyl group is most preferred. The alkenyl group is bonded to the polyalkylene oxide chain via an ether oxygen atom.

The average number of unsaturated groups per molecule of the unsaturated group-terminated polyalkylene oxide is preferably at least 1.5, particularly from 1.8 to 6. Most preferably, it is from 2.1 to 4. Terminal groups other than the unsaturated groups may remain.

The unsaturated group-terminated polyalkylene oxide may itself be used as a curable component of a curable resin. Further, it may be used as a starting material for a hydrolyzable silyl group-terminated polyalkylene oxide, which is obtainable by converting the terminal unsaturated groups to hydrolyzable silyl groups. As a method for converting the unsaturated groups to the hydrolyzable silyl groups, a method may be employed wherein a hydrosilicon compound having a hydrolyzable group is reacted to the unsaturated groups. In such a case, it is preferred to use a Group VIII transition metal catalyst. The Group VIII transition metal catalyst may, for example, be a metal such as platinum, palladium or rhodium, a metal compound such as chloroplatinic acid, or a metal complex compound such as a platinum-olefin complex.

As the hydrosilicon compound, a compound of the following formula (2) is preferred.

$$HSiX'_{3-k}R'_k \quad (2)$$

wherein R' is a monovalent hydrocarbon group or a halogenated hydrocarbon group, X' is a hydrolyzable group, and k is an integer of 0, 1 or 2.

As R', an alkyl group or an aryl group is preferred, and an alkyl group having at most 6 carbon atoms is more preferred. Most preferred is an alkyl group having at most 3 carbon atoms. As the halogenated hydrocarbon group, an alkyl group of the above mentioned carbon number having at least one chlorine or fluorine atom, is preferred. X' is a hydrolyzable group such as a halogen atom, an alkoxy group, an acyloxy group, an amide group, an amino group, an aminoxy group, or a ketoximate group. Preferably, an alkoxy group having at most 4 carbon atoms such as a methoxy group or an ethoxy group, and an acyloxy group such as an acetoxy group, a ketoximate group such as an acetoximate group or a dimethylketoximate group, an N,N-dimethylamino group, or an N-methylacetamide group, may be mentioned. Particularly preferred as the hydrolyzable group is a methoxy group or an ethoxy group. It is also possible that firstly a hydrosilicon compound having a hydrolyzable group such as a chlorine atom as X', is reacted, and then the hydrolyzable group is converted to other hydrolyzable group to obtain a hydrolyzable silyl group having the desired hydrolyzable group.

The average number of hydrolyzable silyl groups per molecule of the hydrolyzable silyl group-terminated polyalkylene oxide thus obtained, is preferably at least 1.5, more preferably at least 1.8, most preferably from 2.1 to 4.

Upon contact with moisture, the hydrolyzable silyl group-terminated polyalkylene oxide in the present invention, undergoes a cross-linking reaction to form a three dimensional structure and cures. The curing mechanism is such that firstly the hydrolyzable group X' is substituted by a hydroxyl group, then the SiOH groups are condensed to each other to form cross-linking, whereby a siloxane linkage (Si—O—Si) is formed, or a siloxane linkage and HX are formed by the reaction of the SiOH group and the SiX' group for curing. The hydrolyzing rate varies depending upon the temperature of the atmosphere, the relative humidity, the type of the hydrolyzable group, etc. Accordingly, it is preferred to properly select the hydrolyzable group depending upon the practical conditions. Further, this hydrolyzable silyl group-terminated polyalkylene oxide having a curable nature is required to avoid contact with moisture during its storage, for example, by keeping it in dry nitrogen.

For the curing reaction, a curing catalyst may or may not be employed. As such a curing catalyst, a metal salt of a carboxylic acid such as an alkyl titanate, an organic silicon titanate, tin octylate or dibutyltin dilaurate, an amine salt such as dibutylamine-2-ethyl hexoate; and other acid catalysts and basic catalysts, may be employed. More preferably, this catalyst is incorporated in an amount of from 0.01 to 5% by weight, relative to the hydrolyzable silyl group-terminated polyalkylene oxide.

To the hydrolyzable silyl group-terminated polyalkylene oxide in the present invention, a reinforcing agent, a filler, a plasticizer, an antisagging agent or a cross-linking agent may be incorporated, as the case requires. As the reinforcing agent, carbon black or fine silica powder may be mentioned. As the filler, calcium carbonate, talc, clay or silica may be mentioned. As the plasticizer, dioctyl phthalate, dibutyl phthalate, dioctyl adipate, chlorinated paraffin or a petroleum plasticizer may be mentioned. As a pigment, an inorganic pigment such as iron oxide, chromium oxide or titanium oxide and an organic pigment such as phthalocyanine blue or phthalocyanine green may be mentioned. As the antisagging agent, calcium carbonate treated with an organic acid, hydrogenated caster oil, aluminum stearate, calcium stearate, zinc stearate or fine silica powder may be mentioned. The cross-linking agent may be a compound corresponding to the above mentioned hydrosilane with its hydrogen atom substituted by a hydrolyzable group or an alkyl group, such as methyltrimethoxysilane or tetraethoxysilane.

The moisture-curable resin composition containing the hydrolyzable silyl group-terminated polyalkylene oxide of the present invention is suitable for use as a coating composition or sealing composition for buildings, air crafts or automobiles, or as a similar product.

Now, the present invention will be described in further detail with reference to Examples. However, it should be understood that the present invention is by no means restricted to such specific Examples.

EXAMPLE 1

Using alyl alcohol as the initiator, polymerization of propylene oxide was conducted by zinc hexacyano cobaltate to obtain a polypropylene oxide having an unsaturated group at one terminal. A methanol solution of sodium methylate was added thereto, and after removing methanol, allyl chloride was added to convert the terminal hydroxyl group to an unsaturated group.

The number average molecular weight and the molecular weight distribution of the obtained unsaturated group-terminated polyalkylene oxide were analyzed by GPC (gel permeation chromatography), whereby the number average molecular weight was found to be 11,800, and the molecular weight distribution (Mw/Mn) was found to be 1.10.

To 1 mol of the above unsaturated group terminated polyalkylene oxide having allyl groups at the terminals, 2 mol of methyldimethoxysilane was reacted in the presence of chloroplatinic acid to obtain a hydrolyzable silyl group-terminated polyalkylene oxide having an average of two methyldimethoxysilyl groups per molecule. The number average molecular weight and the molecular weight distribution of the obtained hydrolyzable silyl group-terminated polyalkylene oxide were analyzed by GPC, whereby the number average molecular weight was found to be 12,000 and the molecular weight distribution (Mw/Mn) was found to be 1.10.

To 100 parts by weight of the obtained hydrolyzable silyl group-terminated polyalkylene oxide, 1 part by weight of dibutyltin dilaurate was mixed as a curing catalyst. This composition was exposed to the atmosphere and permitted to cure by the moisture in the atmosphere. The cured product had a 50% modulus of 3.5 kg/cm$^2$, a tensile strength of 9.0 kg/cm$^2$ and a breaking elongation of 180%.

EXAMPLE 2

Using a diethyleneglycol-propylene oxide adduct having a molecular weight of 1,000 as the initiator, polymerization of propylene oxide was conducted by a zinc hexacyano cobaltate catalyst to obtain a polypropylenediol. A methanol solution of sodium methylate was added thereto, and after removing methanol, allyl chloride was added to convert the hydroxyl groups at both terminals to unsaturated groups. The number average molecular weight and the molecular weight distribution of the obtained unsaturated group-terminated polyalkylene oxide were analyzed by GPC, whereby the number average molecular weight was found to be 14,800, and the molecular weight distribution (Mw/Mn) was found to be 1.10.

To 1 mol of the above unsaturated group terminated polyalkylene oxide having allyl groups at the terminals, 2 mol of methyldimethoxy silane was reacted in the presence of chloroplatinic acid to obtain a hydrolyzable silyl group-terminated polyalkylene oxide having an average of two methyldimethoxy silyl groups per molecule. The number average molecular weight and the molecular weight distribution of the obtained hydrolyzable silyl group-terminated polyalkylene oxide were analyzed by GPC, whereby the number average molecular weight was found to be 15,000, and the molecular weight distribution (Mw/Mn) was found to be 1.10.

To 100 parts by weight of the obtained hydrolyzable silyl group-terminated polyalkylene oxide, 1 part by weight of dibutyltin dilaurate was mixed as a curing catalyst. The composition was exposed to the atmosphere and permitted to cure by the moisture in the atmosphere. The cured product had a 50% modulus of 2.8 kg/cm², a tensile strength of 8.5 kg/cm² and a breaking elongation of 260%.

EXAMPLE 3

Using a glycerol-propylene oxide adduct having a molecular weight of 1,000 as the initiator, polymerization of propylene oxide was conducted by a zinc hexacyano cobaltate catalyst to obtain a polypropylene triol. A methanol solution of sodium methylate was added thereto, and after removing methanol, allyl chloride was added to convert hydroxyl groups to unsaturated groups to obtain an unsaturated group-terminated polyalkylene oxide having an average of three allyl groups per molecules. The number average molecular weight and the molecular weight distribution of the obtained unsaturated group-terminated polyalkylene oxide were analyzed by GPC, whereby the number average molecular weight was found to be 24,800, and the molecular weight distribution (Mw/Mn) was found to be 1.20.

To 1 mol of the above unsaturated group-terminated polyalkylene oxide having allyl groups at the terminals, 2.3 mol of methyldimethoxy silane was reacted in the presence of chloroplatinic acid to obtain a hydrolyzable silyl group-terminated polyalkylene oxide having an average of 2.3 methyldimethoxy silyl groups per molecule. The number average molecular weight and the molecular weight distribution of the obtained hydrolyzable silyl group terminated polyalkylene oxide were analyzed by GPC, whereby the number average molecular weight was found to be 25,000, and the molecular weight distribution (Mw/Mn) was found to be 1.20.

To 100 part by weight of the obtained hydrolyzable silyl group-terminated polyalkylene oxide, 1 part by weight of dibutyltin dilaurate was mixed as a curing catalyst. This composition was exposed to the atmosphere and permitted to cure by the moisture in the atmosphere. The cured product had a 50% modulus of 1.3 kg/cm², a tensile strength of 9.2 kg/cm² and a breaking elongation of 240%.

EXAMPLE 4

Using a glycerol-propylene oxide adduct having a molecular weight of 1,000 as the initiator, polymerization of propylene oxide was conducted by a zinc hexacyano cobaltate catalyst to obtain a polypropylene triol. A methanol solution of sodium methylate was added thereto, and after removing methanol, allyl chloride was added to convert the hydroxyl groups to unsaturated groups to obtain an unsaturated group-terminated polyalkylene oxide having an average of three allyl groups per molecule. The number average molecular weight and the molecular weight distribution of the obtained unsaturated group-terminated polyalkylene oxide were analyzed by GPC, whereby the number average molecular weight was found to be 24,800, and the molecular weight distribution (Mw/Mn) was found to be 1.20.

To 1 mol of the above unsaturated group-terminated polyalkylene oxide having allyl groups at the terminals, 3 mol of methyldimethoxy silane was reacted in the presence of chloroplatinic acid to obtain a hydrolyzable silyl group-terminated polyalkylene oxide having an average of three methyldimethoxy silyl groups per molecule. The number average molecular weight and the molecular weight distribution of the obtained hydrolyzable silyl group-terminated polyalkylene oxide were analyzed by GPC, whereby the number average molecular weight was found to be 25,100, and the molecular weight distribution (Mw/Mn) was found to be 1.20.

To 100 parts by weight of the obtained hydrolyzable silyl group-terminated polyalkylene oxide, 1 part by weight of dibutyltin dilaurate was mixed as a curing catalyst. This composition was exposed to the atmosphere and permitted to cure by the moisture in the atmosphere. The cured product had a 50% modulus of 2.1 kg/cm², a tensile strength of 10.3 kg/cm² and a breaking elongation of 210%.

EXAMPLE 5

Using a glycerol-propylene oxide adduct having a molecular weight of 1,000 as the initiator, polymerization of propylene oxide was conducted by a zinc hexacyano cobaltate catalyst to obtain a polypropylene triol. A methanol solution of sodium methylate was added thereto, and after removing methanol, allyl chloride was added to convert hydroxyl groups to unsaturated groups to obtain an unsaturated group-terminated polyalkylene oxide having an average of three allyl groups per molecule. The number average molecular weight and the molecular weigh distribution of the obtained unsaturated group-terminated polyalkylene oxide were analyzed by GPC, whereby the number average molecular weight was found to be 34,700, and the molecular weight distribution (Mw/Mn) was found to be 1.23.

To 1 mol of the above unsaturated group-terminated polyalkylene oxide having allyl groups at the terminals, 3 mol of methyldimethoxy silane was reacted in the presence of chloroplatinic acid to obtain a hydrolyzable silyl group-terminated polyalkylene oxide having an average of three methyldimethoxy silyl groups per molecule. The number average molecular weight and the molecular weight distribution of the obtained hydrolyzable silyl group-terminated polyalkylene oxide were analyzed by GPC, whereby the number average molecular weight was found to be 35,100, and the molecular weight distribution (Mw/Mn) was found to be 1.23.

To 100 parts by weight of the obtained hydrolyzable silyl group-terminated polyalkylene oxide, 1 part by weight of dibutyltin dilaurate was mixed as a curing catalyst. This composition was exposed to the atmosphere and permitted to cure by the moisture in the atmosphere. The cured product had a 50% modulus of 0.8 kg/cm², a tensile strength of 7.8 kg/cm² and a breaking elongation of 280%.

As described in the foregoing, according to the present invention, a polyalkylene oxide having terminal unsaturated groups with a high molecular weight and a narrow molecular weight distribution can be obtained by a simple and practical method by employing a polyalkylene oxide polymerized by means of a double metal cyanide complex catalyst. Further, by converting the unsaturated groups of this unsaturated group-terminated polyalkylene oxide to hydrolyzable silyl groups, a curable resin which is curable in the presence of moisture, can be obtained. The cured product of this curable resin has excellent physical properties. Thus, the curable resin is useful as a sealing agent, etc.

What is claimed is:

1. A process for producing an unsaturated group-terminated polyalkylene oxide which consists essentially of reacting a monoepoxide having at least 3 carbon atoms with an initiator selected from the group consisting of allyl alcohol and the monoepoxide adducts of polyhydric alcohols, polyhydric phenols and polycarboxylic acids, said adducts having a number average molecular weight of about 1,000, in the presence of a double metal cyanide complex catalyst to effect ring-opening addition polymerization, followed by converting the terminal hydroxyl groups of the resultant hydroxyl group terminated polyalkylene oxide to unsaturated groups wherein the hydroxyl group-terminated polyalkylene oxide obtained by the ring-opening addition polymerization of the monoepoxide is a compound having a number average molecular weight of at least 4,000 per terminal group.

2. The process according to claim 1, wherein the hydroxyl group-terminated polyalkylene oxide obtained by the ring-opening addition polymerization of the monoepoxide is a compound having more than 2 and not more than 6 terminal groups on average and a molecular weight of from 20,000 to 50,000.

3. The process according to claim 1, wherein the monoepoxide having at least 3 carbon atoms is propylene oxide.

4. The process according to claim 1, wherein the initiator is a polyhydroxy compound.

5. The process according to claim 1, wherein the initiator is an unsaturated monohydroxy compound.

6. The process according to claim 1, wherein the unsaturated group-terminated polyalkylene oxide has more than 2 terminal groups on average and at least 1.5 unsaturated groups on average.

7. The process according to claim 1, wherein all of the terminated unsaturated groups of the unsaturated group-terminated polyalkylene oxide are allyl groups.

8. A process for producing a hydrolyzable silyl group-terminated polyalkylene oxide which consists essentially of reacting a monoepoxide having at least three carbon atoms with an initiator selected from the group consisting of allyl alcohol and the monoepoxide a adducts of polyhydric alcohols, polyhydric phenols and polycarboxylic acids, said adducts having a number average molecular weight of about 1,000, in the presence of a double metal cyanide complex catalyst to effect ring-opening addition polymerization, followed by converting the terminal hydroxyl groups of the resulting hydroxyl group terminated polyalkylene oxide to unsaturated groups, and reacting a hydrosilicon compound having a hydrolyzable group to the unsaturated groups wherein the hydroxyl group-terminated polyalkylene oxide obtained by the ring opening addition polymerization of the monoepoxide is a compound having a number average molecular weight of at least 4,000 per terminal group.

9. The process according to claim 8, wherein the hydroxyl group-terminated polyalkylene oxide obtained by the ring-opening addition polymerization of the monoepoxide is a compound having more than 2 and at most 6 terminal groups on average and a molecular weight of from 20,000 to 50,000.

10. The process according to claim 8, wherein the monoepoxide having at least 3 carbon atoms is propylene oxide.

11. The process according to claim 8, wherein the initiator is a polyhydroxy compound.

12. The process according to claim 8, wherein the initiator is an unsaturated monohydroxy compound.

13. The process according to claim 8, wherein the unsaturated group-terminated polyalkylene oxide has more than 2 terminal groups on average and at least 1.5 unsaturated groups on average.

14. The process according to claim 8, wherein all of the terminal unsaturated groups of the unsaturated group-terminated polyalkylene oxide are all groups.

15. The process according to claim 8, wherein the hydrosilicon compound is a compound of the formula:

$$HSiX'_{3-k}R'_k$$

wherein R' is a monovalent hydrocarbon group or a halogenated hydrocarbon group, X' is a hydrolyzable group, and k is an integer of 0, 1 or 2.

16. The process according to claim 8, wherein the hydrolyzable silyl group-terminated polyalkylene oxide has more than two terminal groups on average and at least 1.5 hydrolyzable silyl groups on average.

17. A moisture-curable resin composition containing a hydrolyzable silyl group-terminated polyalkylene oxide produced by the process of claim 23, as a curable component.

18. The moisture-curable resin composition according to claim 17, which contains from 0.01 to 5% by weight, based on the hydrolyzable silyl group-terminated polyalkylene oxide, of a curing catalyst.

19. The process according to claim 8, wherein the hydrosilicon compound is reacted in the presence of a Group VIII transition metal catalyst.

* * * * *